US012616216B2

(12) United States Patent
Libin et al.

(10) Patent No.: US 12,616,216 B2
(45) Date of Patent: May 5, 2026

(54) POULTRY DEBONING DEVICE AND METHOD

(71) Applicant: BLEXLEY HOLDINGS LLC, Columbus, OH (US)

(72) Inventors: Alexander Libin, Columbus, OH (US); Evan Pulsinelli, Millersport, OH (US)

(73) Assignee: BLEXLEY HOLDINGS LLC, Columbus, OH (US)

( * ) Notice: Subject to any disclaimer, the term of this patent is extended or adjusted under 35 U.S.C. 154(b) by 0 days.

(21) Appl. No.: 19/069,388

(22) Filed: Mar. 4, 2025

(65) Prior Publication Data

US 2025/0287963 A1     Sep. 18, 2025

Related U.S. Application Data

(60) Provisional application No. 63/565,833, filed on Mar. 15, 2024.

(51) Int. Cl.
*A22C 21/00*          (2006.01)

(52) U.S. Cl.
CPC ...... *A22C 21/0069* (2013.01); *A22C 21/0046* (2013.01)

(58) Field of Classification Search
CPC ............ A22C 21/0069; A22C 21/0076; A22C 21/0046; A22C 21/0084; A22C 17/004; A22C 21/0053

USPC ......................................................... 452/135
See application file for complete search history.

(56) References Cited

U.S. PATENT DOCUMENTS

| | | | |
|---|---|---|---|
| 4,097,960 A | | 7/1978 | Graham et al. |
| 4,392,273 A | | 7/1983 | De Long |
| 4,993,113 A | * | 2/1991 | Hazenbroek ....... A22C 21/0076 |
| | | | 452/167 |
| 11,974,580 B2 | | 5/2024 | Libin et al. |

* cited by examiner

*Primary Examiner* — Richard T Price, Jr.
(74) *Attorney, Agent, or Firm* — SQUIRE PATTON BOGGS (US) LLP

(57)          ABSTRACT

An apparatus and method for poultry deboning. The poultry deboning apparatus may include a holder device including a holder chuck configured to hold a poultry product. The holder chuck may include an opening configured to receive a first portion of the poultry product and one or more blades configured to engage the first portion of the poultry product. The poultry deboning apparatus may include a grabber device including a grabber chuck configured to grab a second portion of the poultry product. The grabber chuck may include an opening configured to receive the second portion of the poultry product and one or more blades configured to extend into the opening and engage the second portion of the poultry product. The grabber device may be configured to move away from the holder chuck to remove a bone in the second portion of the poultry product.

20 Claims, 11 Drawing Sheets

SEE FIG. 2A

SEE FIG. 2C

SEE FIG. 2D

110

142

SEE FIG. 2B

SEE FIG. 2E

120

130

140

144

146

150

100

400

410

416

415

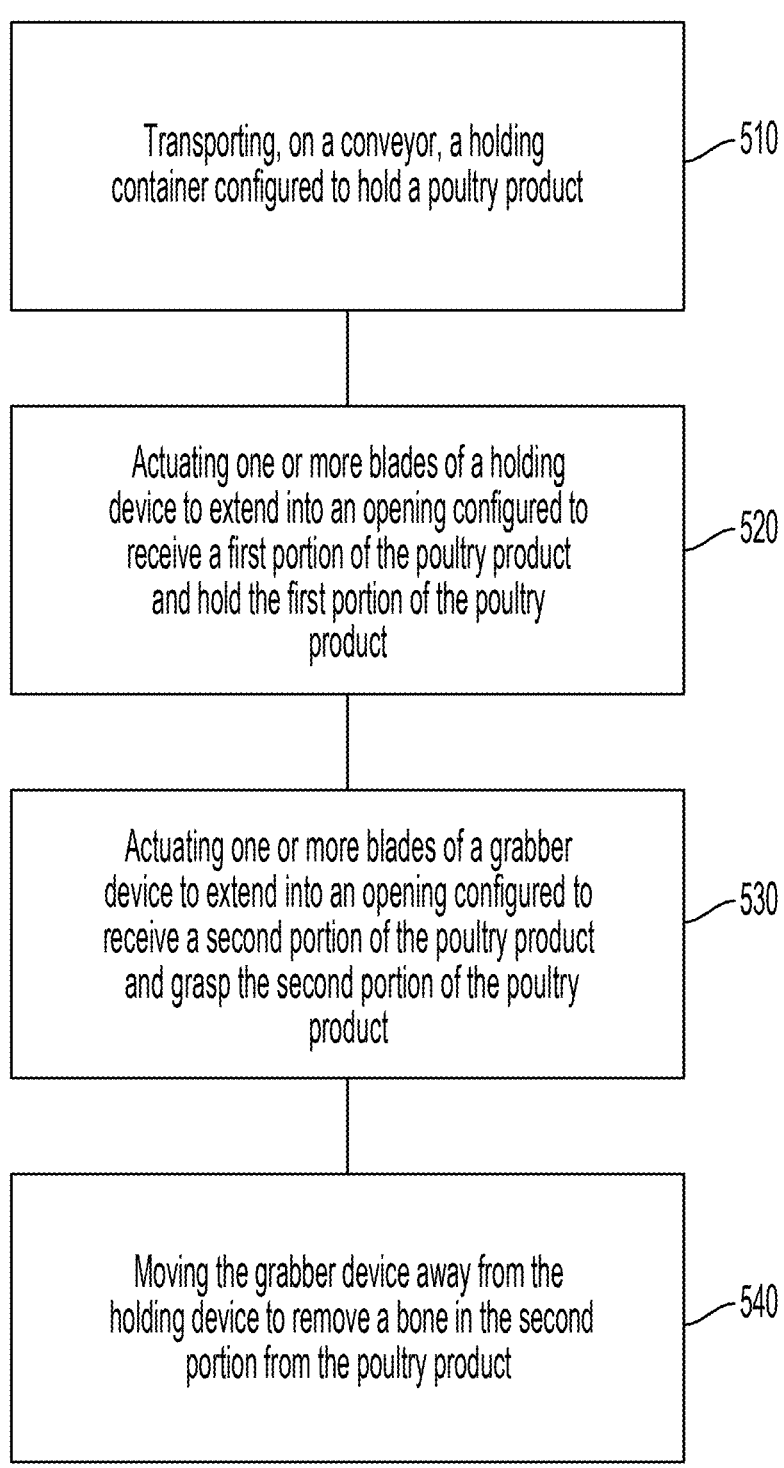

Transporting, on a conveyor, a holding
container configured to hold a poultry product ⌐510

Actuating one or more blades of a holding
device to extend into an opening configured to
receive a first portion of the poultry product
and hold the first portion of the poultry
product ⌐520

Actuating one or more blades of a grabber
device to extend into an opening configured to
receive a second portion of the poultry product
and grasp the second portion of the poultry
product ⌐530

Moving the grabber device away from the
holding device to remove a bone in the second
portion from the poultry product ⌐540

FIG. 5

POULTRY DEBONING DEVICE AND METHOD

CROSS REFERENCE TO RELATED APPLICATION

This application claims the benefit of U.S. provisional patent application No. 63/565,833, filed Mar. 15, 2024. The entire content of the above-referenced application is hereby incorporated by reference.

TECHNICAL FIELD

Some example embodiments may generally relate to the processing of poultry, particularly turkey, and separating the bones from the meat of a poultry carcass.

BACKGROUND

Methods and apparatuses for butchering or otherwise obtaining meat from poultry are well-known in the art. During processing of poultry, it may be necessary to remove the meat from the bones and carcass. This may be referred to as the bone removal process or deboning process, which may be used interchangeably herein. Conventional methods and apparatus for poultry deboning in poultry processing facilities may involve a bone removal or deboning process for a poultry carcass which may require the unnecessary and/or excessive use of manual labor and manual cutting of the poultry meat from the bone. This conventional manual process may require a high degree of difficulty and may be strenuous on the human body over time, which may make it inefficient or impractical in commercial facilities. The conventional processes may be labor intensive and time consuming. For example, the conventional methods may require multiple people to perform various types of incisions manually with a handheld knife. This may require extensive, training, skill, and time, and allows for more opportunities for human error and inefficiencies.

Some conventional methods may have implemented a semi-mechanical device which performs a deboning process using both manual operations used in conjunction with the mechanisms of the semi-mechanical device. The semi-mechanical device in conventional deboning processes may use a combination of high-pressure liquid (e.g., water) and compressed air to perform the bone removal process. The use of high-pressure liquid, such as water, during the bone removal in conventional semi-mechanical devices may alter the appearance and/or texture of the meat when removed (also referred to as the finished meat). A secondary process or post-processing procedure to remove excess water from the finished meat may also be required, which further increases the complexity and time necessary for deboning.

The conventional deboning processes which use high-pressure or compressed air may be prone to breaking or chipping the bones during the removal process, which creates a food safety hazard and requires additional manual labor or other processes to remove the broken bones. Removing any bones after the deboning process may result in yield losses which in turn result in reduced revenue from the value of the finished meat or lost meat.

SUMMARY

Various exemplary embodiments may provide an apparatus including a holder device including a holder chuck configured to hold a poultry product. The holder chuck may include an opening configured to receive a first portion of the poultry product and one or more blades configured to extend into the opening and hold the first portion of the poultry product. The apparatus may also include a grabber device including a grabber chuck configured to grab a second portion of the poultry product. The grabber chuck may include an opening configured to receive the second portion of the poultry product and one or more blades configured to extend into the opening and engage the second portion of the poultry product. The grabber device may be configured to move away from the holder chuck to remove a bone in the second portion of the poultry product.

Certain exemplary embodiments may provide an apparatus including a holding container configured to hold a poultry product and a conveyor configured to move the holding container. The apparatus may also include a deboning device. The deboning device may include a holder device including a holder chuck configured to hold the poultry product which protrudes from the holder device. The holder chuck may include an opening configured to receive a first portion of the poultry product and one or more blades configured to extend into the opening and engage the first portion of the poultry product. The deboning device may also include a grabber device including a grabber chuck configured to grab a second portion of the poultry product. The grabber chuck may include an opening configured to receive a second portion of the poultry product and one or more blades configured to extend into the opening and engage the second portion of the poultry product. The grabber device may be configured to move away from the holder chuck to remove a bone in the second portion of the poultry product.

Some exemplary embodiments may provide a method including actuating one or more blades of a holding device to extend into an opening configured to receive a first portion of a poultry product and hold the first portion of the poultry product and actuating one or more blades of a grabber device to extend into an opening configured to receive a second portion of the poultry product and grab the second portion of the poultry product. The method may further include moving the grabber device away from the holding device to remove a bone in the second portion from the poultry product.

BRIEF DESCRIPTION OF THE DRAWINGS

For a proper understanding of example embodiments, reference should be made to the accompanying drawings, as follows:

FIG. 5 illustrates an example of a flow diagram of a method, according to some exemplary embodiments.

DETAILED DESCRIPTION

Figure 1:
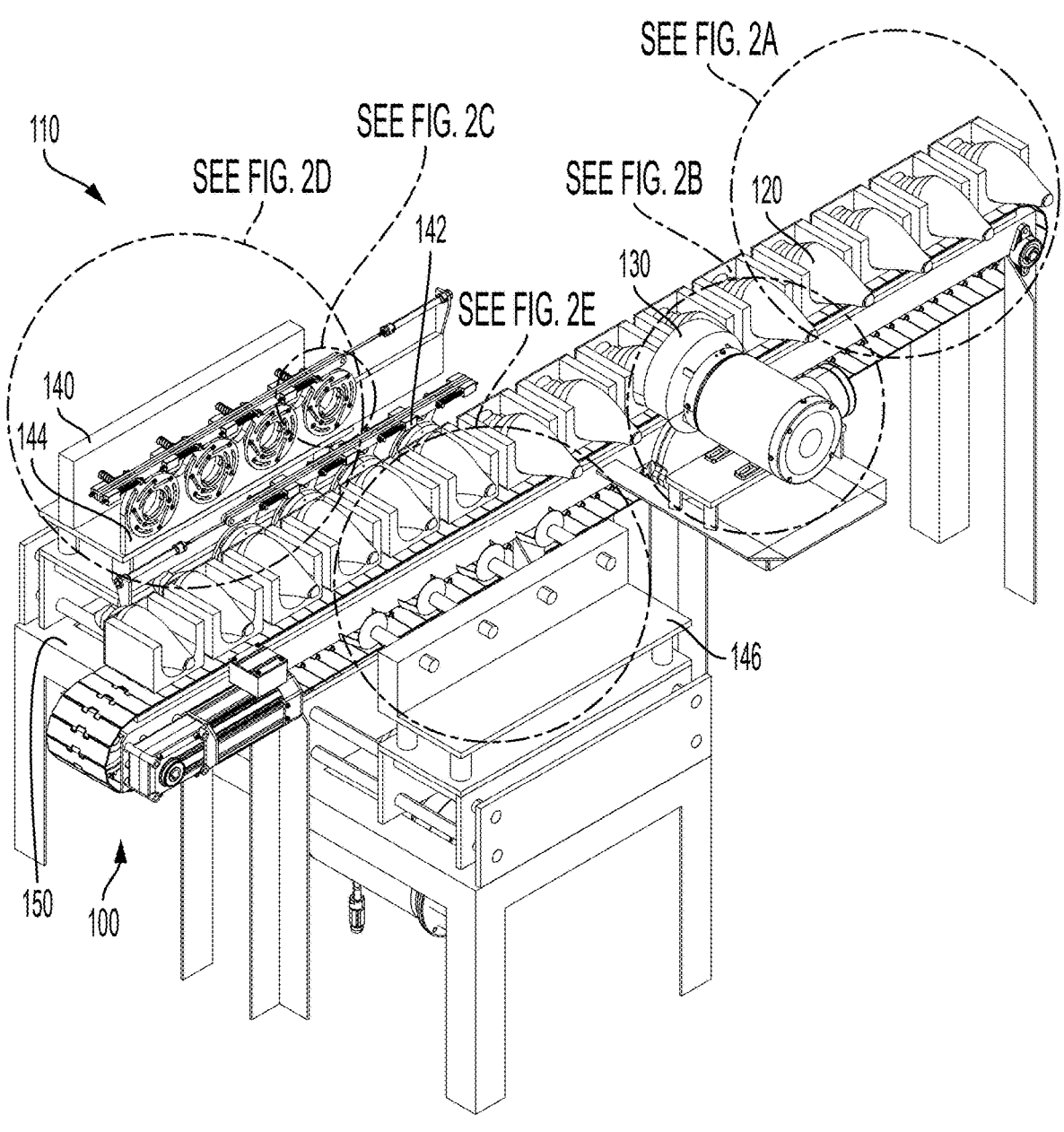
FIG. 1 illustrates an example of a deboning system, according to various exemplary embodiments.

It will be readily understood that the components of certain example embodiments, as generally described and illustrated in the figures herein, may be arranged and designed in a wide variety of different configurations. The following is a detailed description of some example embodiments of systems, methods, and apparatuses, for poultry deboning device(s) and method(s).

It may be readily understood that the components of certain example embodiments, as generally described and illustrated in the figures herein, may be arranged and designed in a wide variety of different configurations. Different reference designations from multiple figures may be used out of sequence in the description, to refer to a same element to illustrate their features or functions. If desired, the different functions or procedures discussed herein may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Various exemplary embodiments may advantageously improve upon the conventional deboning processes by providing a system, apparatus, and method for deboning a poultry carcass for reducing the amount of liquid and/or compressed air or entirely eliminating the use of liquid and/or compressed air during an improved deboning process. Certain exemplary embodiments may provide a system, an apparatus, and a method of removing the bones from the poultry carcass semi-automatically using actuated pushing and pulling mechanisms, which use little to no compressed air and liquid (e.g., water). The actuation of the pushing and pulling mechanisms may be powered electrically, hydraulically, or the like.

Some exemplary embodiments may implement a deboning system which includes a conveyor to transport products (e.g., poultry carcasses, such as turkey) to a cutting tool, which may include a rotary blade, and then to a bone removal device, which may also be referred to as a deboning device, before continuing to post-processing. The bone removal device may include various devices/tools, such as grabbers, pushers, and clamps which work in conjunction to remove the bone from the meat. Bones removed by the bone removal device my exit the deboning system from the bone removal device and may be conveyed to other areas for further use and/or to be discarded. The finished meat without bones may be transported by the indexing conveyor from the bone removal device to a discharge module of the deboning system. Once the meat is at the discharge module, it may be removed from a transport cavity by, for example, gravity, and may then be transported to other areas of a processing facility to be used for various further processing, if desired.

Certain exemplary embodiments may provide a deboning system, apparatus, and method which advantageously improves the deboning process and removes the meat from the poultry carcass in a more efficient and effective manner while reducing damage to the meat and/or the need for additional post-processing of the meat.

FIG. 1 illustrates an example of a deboning system, according to various exemplary embodiments. The exemplary deboning system 100 may include a conveyor 110 which is actuated to convey a poultry carcass (also referred to as a poultry product), or portion thereof, into and through the deboning apparatus and/or system. The conveyor 110 may be, for example, a belt conveyor, roller conveyor, chain conveyor, or the like. In the example shown in FIG. 1, the conveyor 110 may be an indexing-type conveyor, which may move the poultry product in a series of steps or start-stop movements. One or a plurality of holders 120 may be formed on or attached to the conveyor 110, such that the holder 120 moves due to the movement of the conveyor 110. For example, the holder may be formed of various materials, such as plastic, ultra-high molecular weight polyethylene (UHMW), metal, and/or the like. The holder 120 may include a cavity 122 formed therein. The cavity 122 of the holder 120 may be shaped and configured to accommodate the poultry product. The cavity 122 may be recessed into a surface of the holder 120 and open through a top and/or a side wall of the holder 120 to allow the poultry product to be accessed or input to the cavity 122.

Certain exemplary embodiments may provide that the deboning system 100 includes a cutting tool 130 which is adjacent to or attached to the conveyor 110. The cutting tool 130 may include a cutting blade, such as a rotary blade, to cut poultry product. The cutting tool may be powered electrically, hydraulically, or the like. As the conveyor 110 moves, the holder 120 may move to the cutting tool 130 and the conveyor 110 may temporarily stop at the cutting tool 130 to allow for a cutting operation to be performed. When a poultry product is located within the holder 120, the cutting tool 130 may cut and remove a portion of the poultry product. For example, the cutting tool 130 may cut a drumstick of the poultry product at a joint end of a bone of the drumstick. The exemplary embodiments are not limited to a drumstick or cutting at a joint end. Various exemplary embodiments may provide that any desired portion of any type of poultry product may be cut and removed. Further, in some exemplary embodiments, the cutting tool 130 may be omitted entirely or may be bypassed when cutting is not desired or needed for the deboning process.

The conveyor 110 may restart or continue to move the holder 120 to a deboning device 140 of the deboning system 100. The deboning device 140 may include a holder chuck 142 and a grabber chuck 144. In certain exemplary embodiments, the deboning device 140 may also include a pushing device 146. The structure of the holder chuck 142, the grabber chuck 144, and the pushing device 146 will be explained in more detail below. Once the holder 120 with the poultry product has moved to the deboning device, the conveyor 110 may temporarily stop such that the deboning device 140 may act on the poultry product. The holder chuck 142, the grabber chuck 144, and the pushing device 146 may be aligned relative to each other and relative to the conveyor 110. For example, in some exemplary embodiments, when performing a deboning process, the holder chuck 142, the grabber chuck 144, and the pushing device 146 may be aligned to have a same central axis, which may be, for example, perpendicular or orthogonal to a movement direction or longitudinal axis of the conveyor 110.

The conveyor 110 may stop each holder 120 with the poultry product at the central axis of the pushing device 146. In the example shown in FIG. 1, there are four sets of the holder chuck 142, the grabber chuck 144, and the pushing device 146. The conveyor 110 may position a holder 120 in alignment with each of these four sets of the holder chuck 142, the grabber chuck 144, and the pushing device 146. Once the holder 120 is in position, the pushing device 146 makes contact with the cut end of the poultry product, which was cut by the cutting device 130, and applies a force to push the other end of the poultry product into the holder chuck 142. The force applied may be sufficient to cause a bone of the poultry product to protrude from the holder chuck 142, which may be grabbed by the grabber chuck 144. The force applied by the pushing device 146 may be monitored and detected by one or more sensors, such as pressure sensors. The holder chuck 142 may close or partially close around the poultry product to hold a portion of the poultry product which includes the meat. For example, the holder chuck 142 may include an opening, which may be circular or any other suitable shape, through with the poultry product may be inserted. The holder chuck 142 may include a plurality of blades which extend into and/or retract from the opening. To perform the holding of the poultry product, the plurality of blades extends into the opening and contact a portion of the poultry product. For example, the plurality of blades may be circumferential blades which move in a circumferential motion as the blades extend into the opening.

Various exemplary embodiments may provide that once the poultry product is in the holder chuck 142, the grabber chuck 144 may be moved to grab a portion of the poultry product which protrudes from the holder chuck 142. The portion of the poultry product which protrudes from the holder chuck 142 may be inserted into an opening of the grabber chuck 144 and the grabber chuck 144 may close or partially close to grab onto the portion of the poultry product. For example, the grabber chuck 144 may include an opening, which may be circular or any other suitable shape, through with the poultry product may be inserted. The grabber chuck 144 may include a plurality of blades which extend into and/or retract from the opening. To perform the holding of the poultry product, the plurality of blades extends into the opening and contact a portion of the poultry product, such as a bone to be removed within the poultry product. For example, the plurality of blades may be circumferential blades which move in a circumferential motion as the blades extend into the opening to surround the poultry product.

After grabbing the portion (e.g., bone) of the poultry product, the grabber chuck 144 may move away from the holder chuck 142 to pull and remove the bone from the remaining portion of the poultry product, which is held by the holder chuck 142. For example, the grabber chuck 144 may move linearly along its central axis away from the holder chuck 142. In some exemplary embodiments, the pushing device 146 may also provide a pushing force on the poultry product in the same direction as the grabber chuck 144 moves away from the holder chuck 142 to aid in removing the bone. Once the bone is removed, the plurality of blades of grabber chuck 144 may retract to release the bone, which may proceed to an exit cavity 150, and the pushing device 146 may retract in a case in which the pushing device 146 aids in the bone removal. The conveyor 110 may then continue moving to perform the bone removal process on additional poultry products and to transport the deboned poultry products for further processing and/or packaging.

Figure 2A:
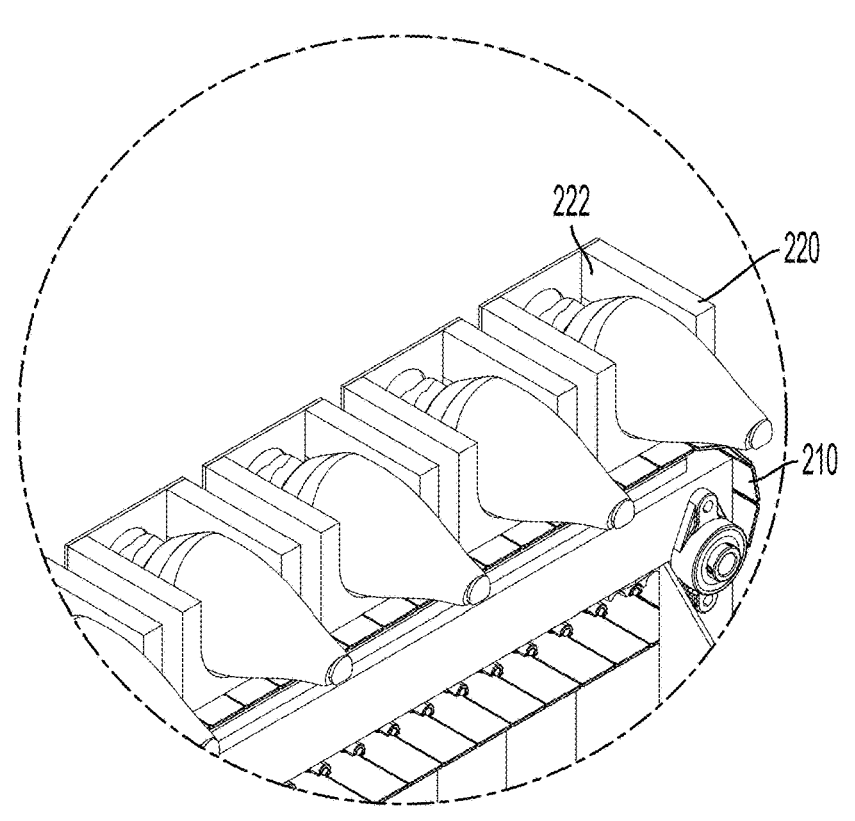
FIG. 2A illustrates an example of components of the deboning system, according to certain exemplary embodiments.

FIGS. 2A-2E illustrate examples of various components of the deboning system, according to certain exemplary embodiments. FIG. 2A illustrates an example of a conveyor 210 and a plurality of holders 220 located on the conveyor 210. The conveyor 210 may be manually moved or driven (e.g., electrically, hydraulically, mechanically, or the like) to transport the plurality of holders 220 into and through the deboning apparatus and/or system. The conveyor 210 may be, for example, a belt conveyor, roller conveyor, chain conveyor, or the like. For example, the conveyor 210 may be an indexing-type conveyor, which may move the poultry product in a series of steps or start-stop movements. The plurality of holders 220 may be formed on or attached to the conveyor 210, such that the holders 220 move due to the movement of the conveyor 210. For example, the holder may be formed of various materials, such as plastic, ultra-high molecular weight polyethylene (UHMW), metal, and/or the like. As shown in FIG. 2A, the holders 220 may include a cavity 222 formed therein. The cavity 222 of each of the holders 220 may be shaped and configured to accommodate the poultry product. The cavity 222 may be recessed into a surface of the holder 220 and open through a top and/or a side wall of the holder 220. The cavity may be, for example, U-shaped or substantially U-shaped in a cross-sectional view.

Figure 2B:
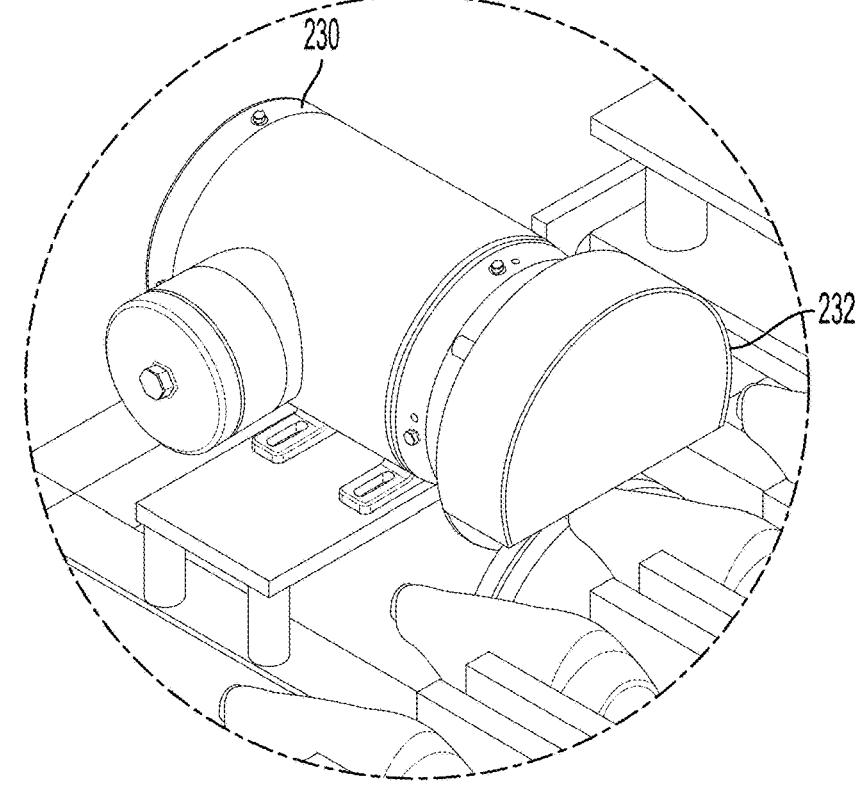
FIG. 2B illustrates an example of additional components of the deboning system, according to certain exemplary embodiments.

FIG. 2B illustrates an example of a cutting device 230, according to certain exemplary embodiments. The cutting device 230 may be electrically driven or otherwise motorized to perform a cutting process. The cutting device 230 may be a rotary type, reciprocating type, or the like. The conveyor 210 moves each of the holders 220 to the cutting tool 230 and the conveyor 210 may temporarily stop at the cutting tool 230 to allow for a cutting operation to be performed. The cutting tool 130 may cut and remove a portion of the poultry product, such as, for example, cutting a drumstick at a joint end of a bone of the drumstick and removing a portion of the joint end of the drumstick.

Figure 2C:
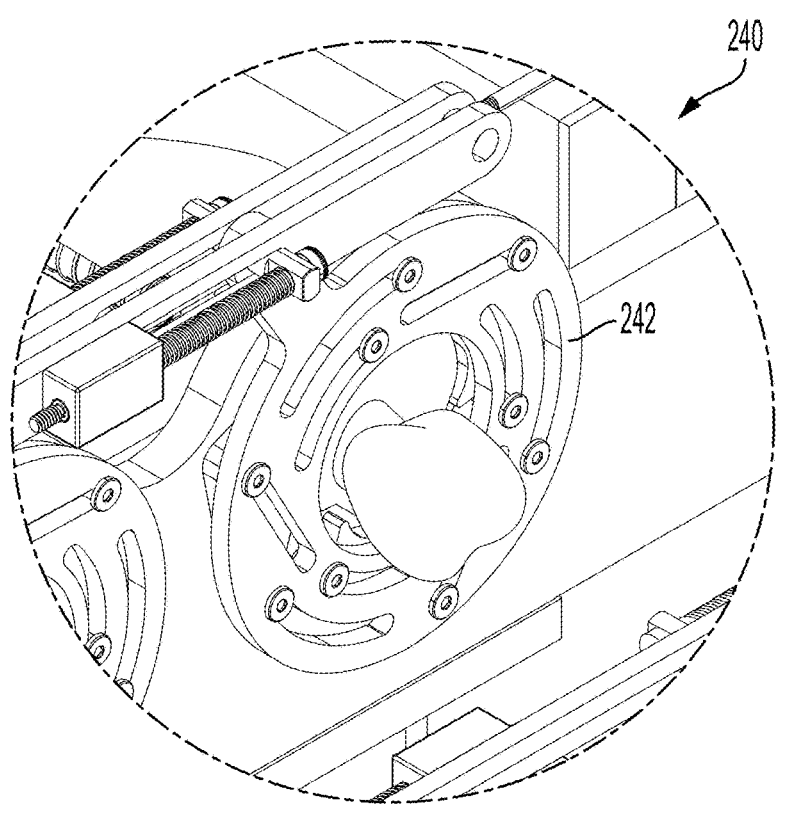
FIG. 2C illustrates an example of further components of the deboning system, according to certain exemplary embodiments.

FIG. 2C illustrates a portion of a deboning device 240, according to some exemplary embodiments. The deboning device 240 may include a holder chuck 242 with an opening through which a portion of the poultry product may be inserted from the holder 210. The holder chuck 242 may be formed of a rotational plate which is rotated by an actuator and may cause the holder chuck 242 to restrict the opening to hold the portion of the poultry product. The structure of the holder chuck 242 will be described in more detail with respect to FIGS. 3A-3F.

Figure 2D:
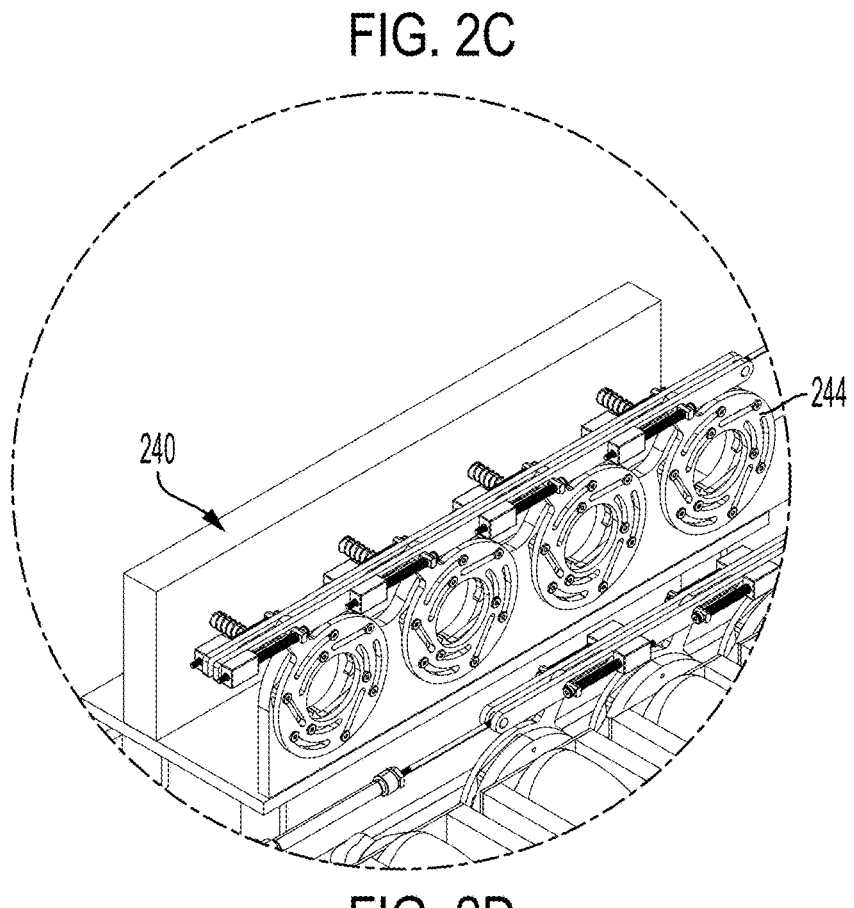
FIG. 2D illustrates an example of other components of the deboning system, according to certain exemplary embodiments.

FIG. 2D illustrates another portion of the deboning device 240, according to various exemplary embodiments. The deboning device 240 may include a grabber chuck 244 which may be aligned with the holder chuck 242. A central axis of the holder chuck 242 and a central axis of the grabber chuck 244 may be aligned to form the same axis. Similar to the holder chuck 242, the grabber chuck 244 may be formed of a rotational plate which is rotated by an actuator and may cause the grabber chuck 244 to restrict the opening to hold the portion of the poultry product. The structure of the grabber chuck 244 will be described in more detail with respect to FIGS. 4A-4F.

Figure 2E:
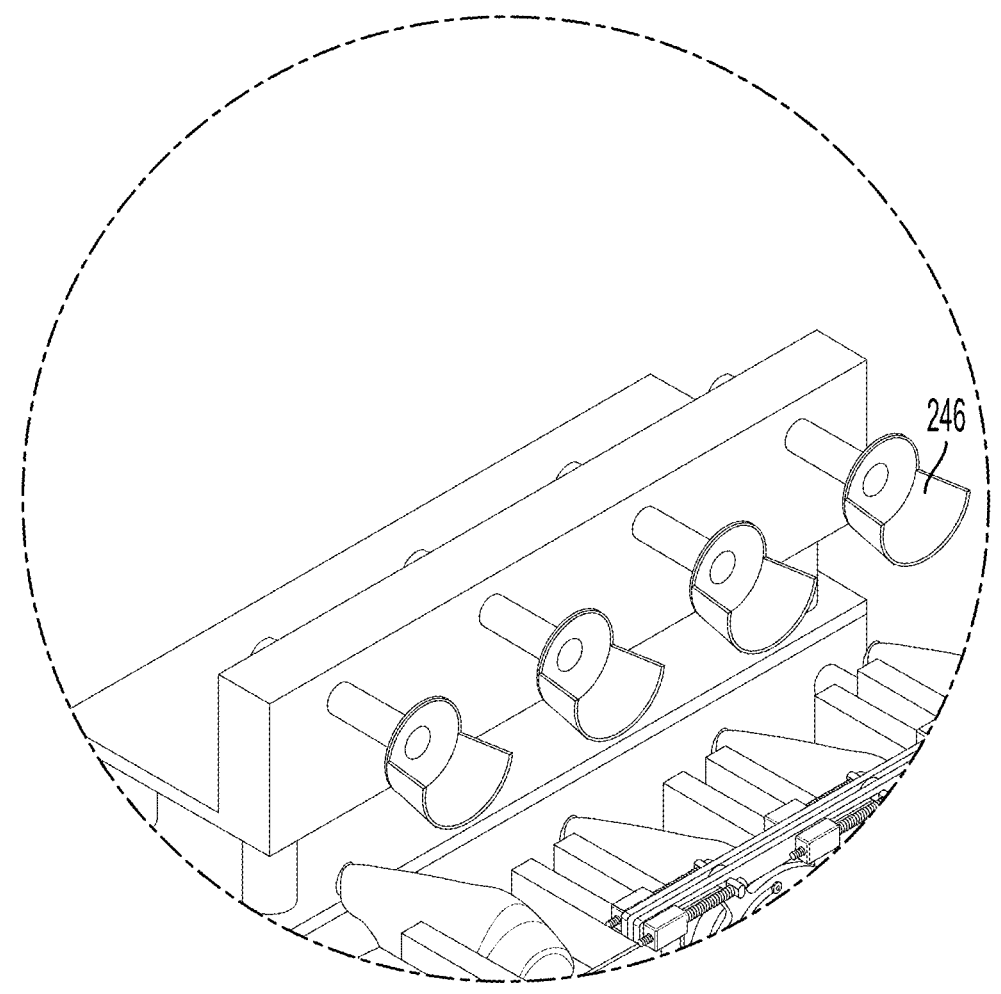
FIG. 2E illustrates an example of even further components of the deboning system, according to certain exemplary embodiments.

FIG. 2E illustrates a further portion of the deboning device 240, according to certain exemplary embodiments. The deboning device 240 may include one or more pushing devices 246. For example, as shown in FIG. 2E, the deboning device 240 may include a plurality of the pushing devices 246. The pushing devices 246 may be actuated to extend and retract linearly towards and away from the holder 220 and the poultry product therein. The pushing devices 246 may be manually moved or driven (e.g., electrically, hydraulically, mechanically, or the like) to apply a force against the poultry product to propel the poultry product at least partially into the holder chuck 242. An end portion of each pushing device 246 may be shaped or contoured to aid in applying a force against the poultry product while minimizing damage to the poultry product. For example, the end portion of each pushing device 246 may be semi-circular, as shown in FIG. 2E.

Figure 3B:
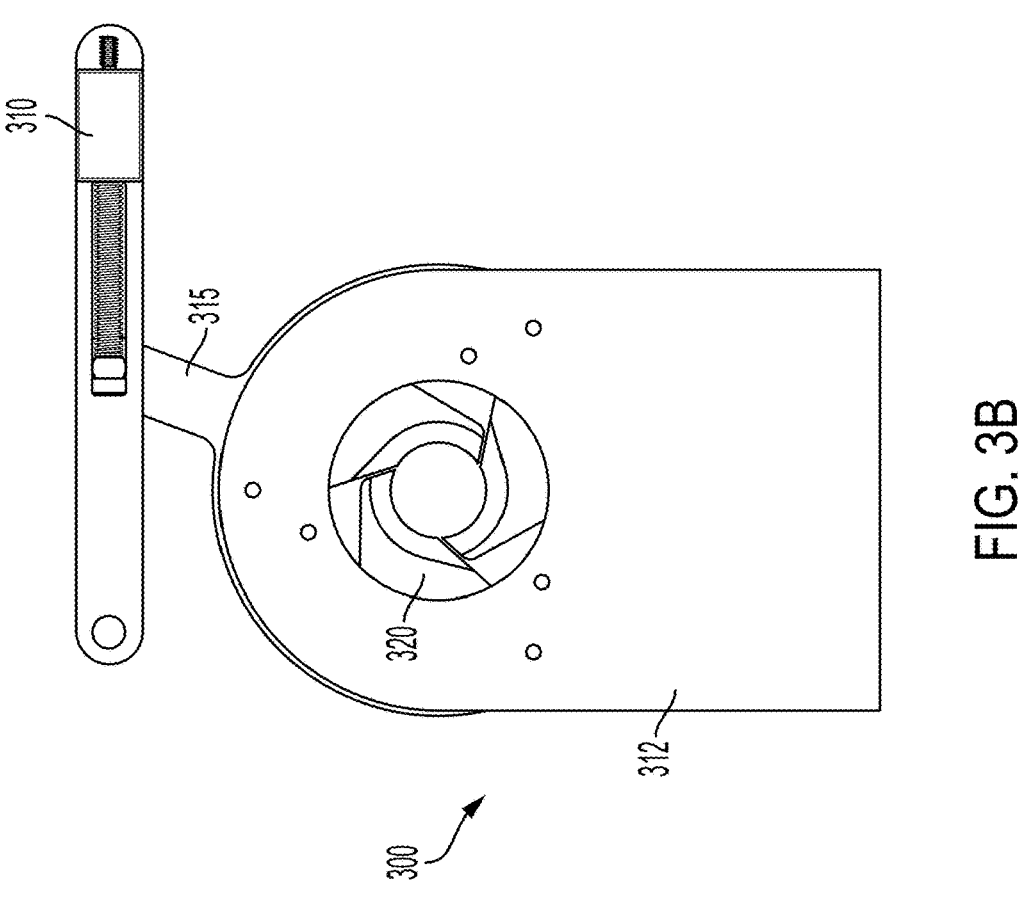
FIG. 3B illustrates another example of a rear planar view of a holder chuck, according to certain exemplary embodiments.
Figure 3A:
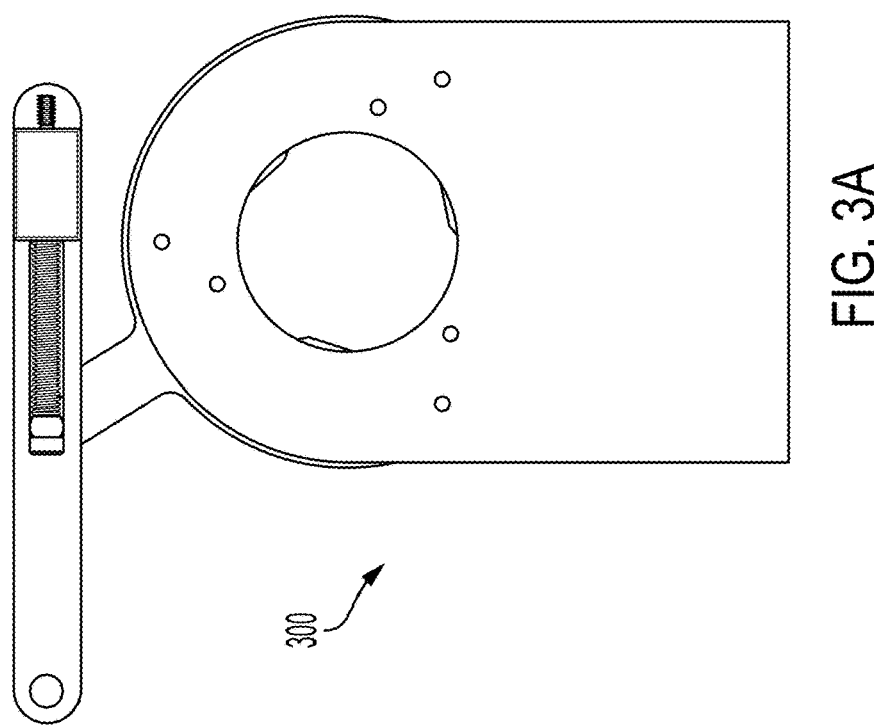
FIG. 3A illustrates an example of a rear planar view of a holder chuck, according to some exemplary embodiments.

FIGS. 3A-3F illustrates various perspective views of a holder chuck 300, according to some exemplary embodiments. FIGS. 3A and 3B illustrate planar views of a first side (e.g., a rear side) of the holder chuck 300. The holder chuck 300 may include an actuator 310 which may cause a rotational chuck plate 315 to rotate clockwise or counterclockwise, which may in turn cause a plurality of blades 320 to rotate inward towards a center of the holder chuck 300. The actuator 310 may be of any type, such as, for example, a ball screw, rack and pinion, or the like. The plurality of blades 320 may extend or retract into an opening positioned on the central axis of the holder chuck 300. The rotation of the plurality of blades 320 may cause the plurality of blades 320 to surround a bone of the poultry product and hold the poultry product when forces are applied to the poultry product by the grabber chuck 140/240 and/or the pushing device 146/246. An inner circumferential end portion of each of the plurality of blades 320 may be beveled to aid in separation of the meat from the bone during the deboning process.

Figure 3D:
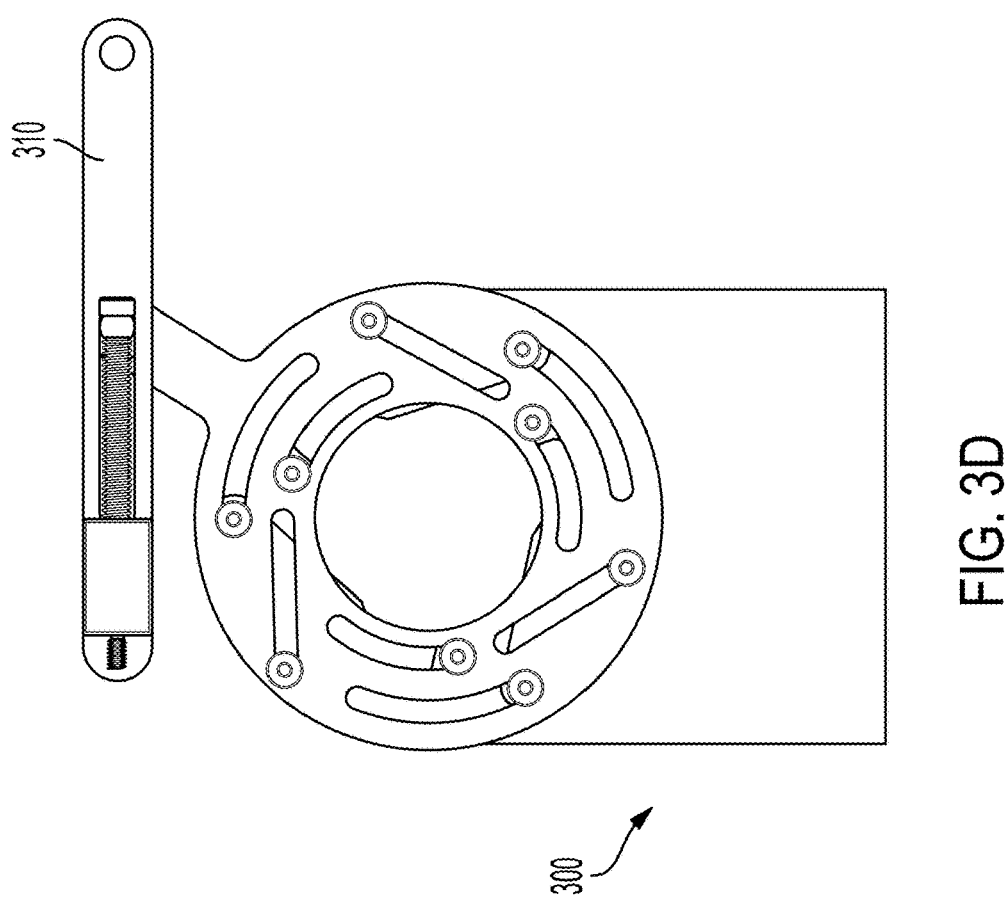
FIG. 3D illustrates an example of a front planar view of a holder chuck, according to some exemplary embodiments.
Figure 3C:
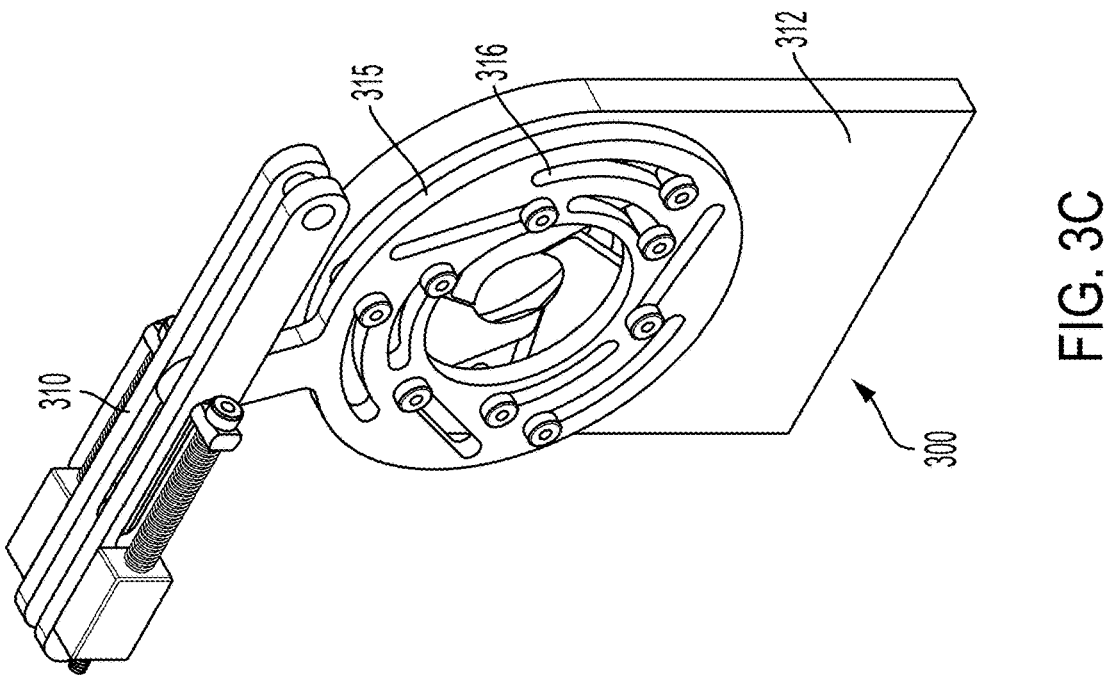
FIG. 3C illustrates an example of a perspective view of a holder chuck, according to various exemplary embodiments.
Figure 3F:
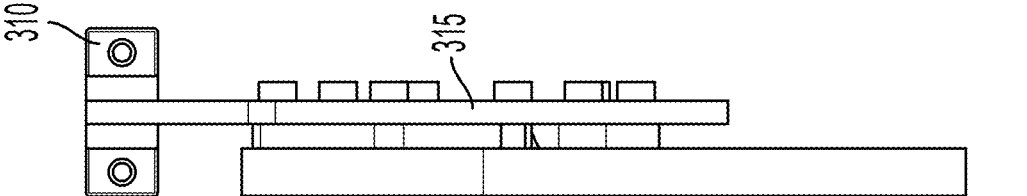
FIG. 3F illustrates an example of a side planar view of a holder chuck, according to certain exemplary embodiments.

FIG. 3C illustrates an example of a perspective view of the holder chuck 300, according to various exemplary embodiments. As shown in FIG. 3F, the plurality of blades 320 may be sandwiched between the rotational chuck plate 315 and a back plate 312 of the holder chuck 300. The rotational chuck plate 315 may include a plurality of grooves 316 in which pins, bolts, or other rods of the plurality of blades 320 are disposed. As the rotational chuck plate 315 is rotated by the actuator 310, the pins, bolts, or other rods may slide within the plurality of grooves 316 and cause rotation of the plurality of blades 320. Central axes of the back plate 312 and the rotational chuck plate 315 may be aligned and may form the same axis.

Figure 3E:
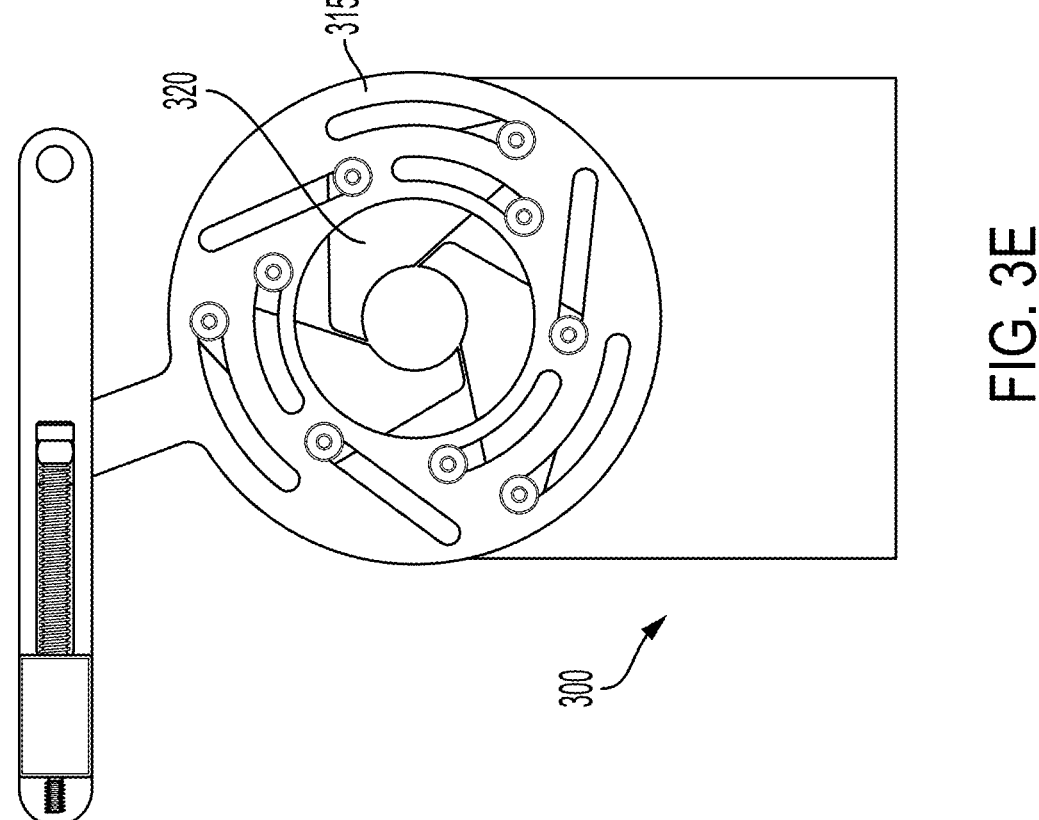
FIG. 3E illustrates another example of a front planar view of a holder chuck, according to some exemplary embodiments.

FIGS. 3D-3F illustrate various additional example views of the holder chuck 300, according to certain exemplary embodiments. For example, FIGS. 3D and 3E may illustrate planar views of a second side (e.g., a front side) of the holder chuck 300.

Figures 4A, 4B:
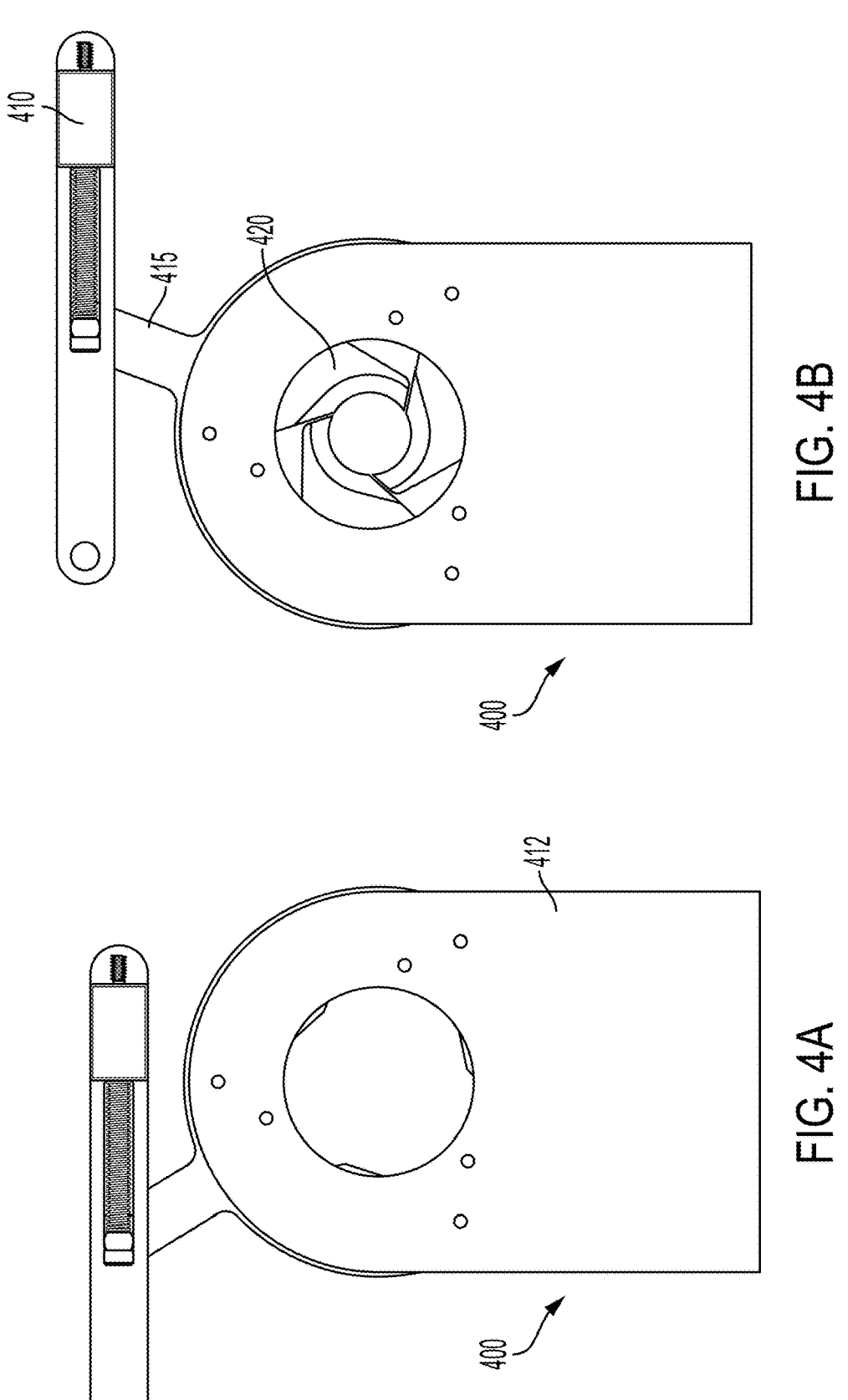
FIG. 4A illustrates an example of a rear planar view of a grabber chuck, according to some exemplary embodiments.
FIG. 4B illustrates another example of a rear planar view of a grabber chuck, according to certain exemplary embodiments.

FIGS. 4A-4F illustrates various perspective views of a grabber chuck 400, according to some exemplary embodiments. FIGS. 4A and 4B illustrate planar views of a first side (e.g., a rear side) of the grabber chuck 400. The grabber chuck 400 may include an actuator 410 which may cause a rotational chuck plate 415 to rotate clockwise or counterclockwise, which may in turn cause a plurality of blades 420 to rotate inward towards a center of the grabber chuck 400. The actuator 410 may be of any type, such as, for example, a ball screw, rack and pinion, or the like. The plurality of blades 420 may extend or retract into an opening positioned on the central axis of the grabber chuck 400. The rotation of the plurality of blades 420 may cause the plurality of blades 420 to surround a bone of the poultry product and hold the poultry product when forces are applied to the poultry product by the grabber chuck 400 and/or the pushing device 146/246. An inner circumferential end portion of each of the plurality of blades 420 may be beveled to aid in separation of the meat from the bone during the deboning process. The beveling of the plurality of blades 420 of the grabber chuck 400 may be equal to or finer/sharper than the beveled edges of the plurality of blades 320 of the holder chuck 300.

Figure 4D:
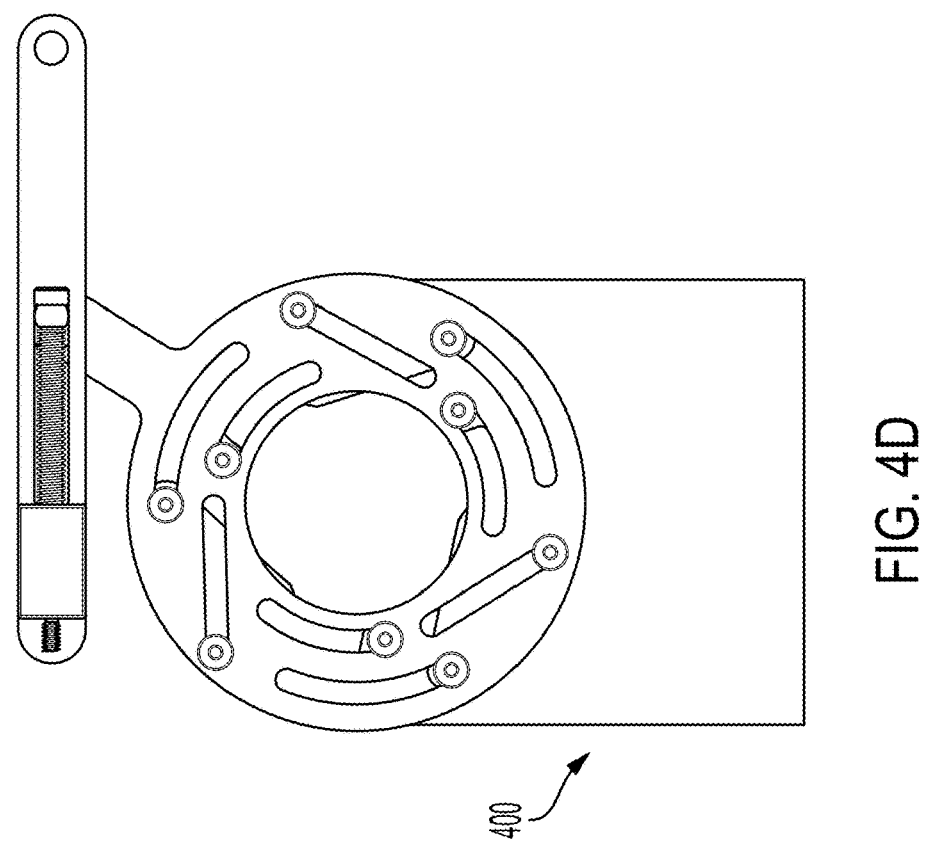
FIG. 4D illustrates an example of a front planar view of a grabber chuck, according to some exemplary embodiments.
Figure 4C:
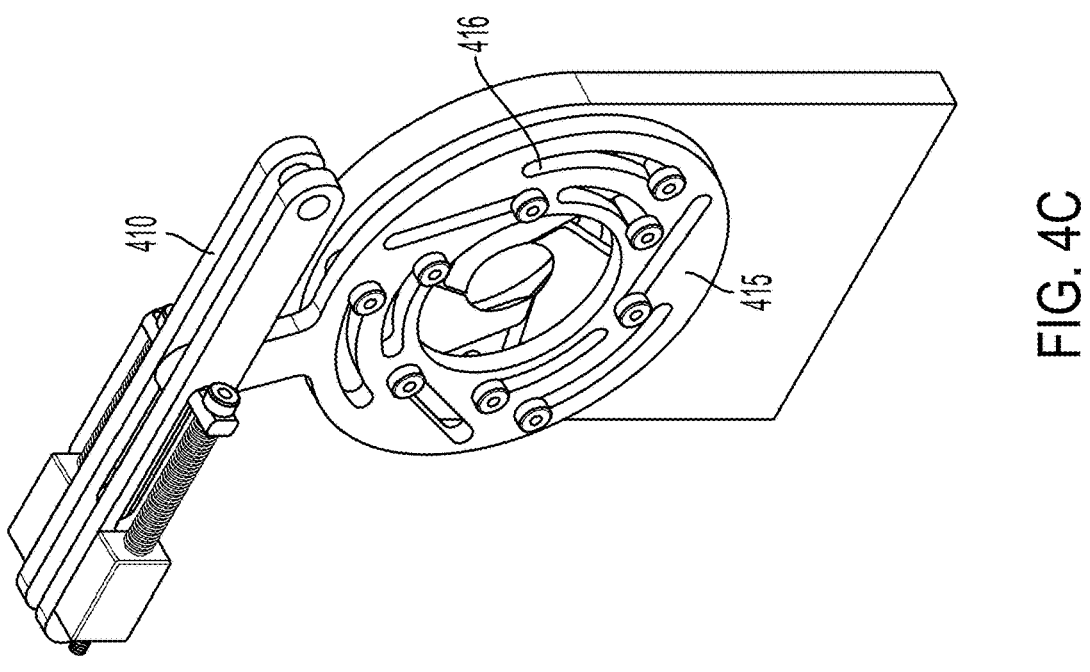
FIG. 4C illustrates an example of a perspective view of a grabber chuck, according to various exemplary embodiments.
Figure 4F:
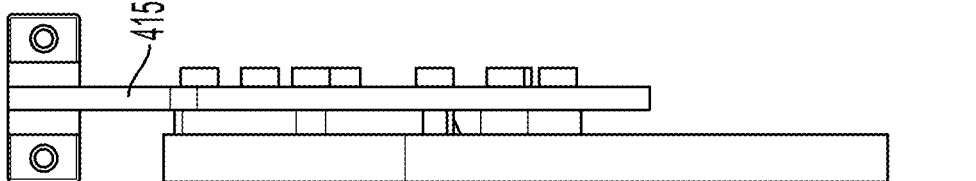
FIG. 4F illustrates an example of a side planar view of a grabber chuck, according to certain exemplary embodiments.

FIG. 4C illustrates an example of a perspective view of the grabber chuck 400, according to various exemplary embodiments. As shown in FIG. 4F, the plurality of blades 420 may be sandwiched between the rotational chuck plate 415 and a back plate 412 of the grabber chuck 400. The rotational chuck plate 415 may include a plurality of grooves 416 in which pins, bolts, or other rods of the plurality of blades 420 are disposed. As the rotational chuck plate 415 is rotated by the actuator 410, the pins, bolts, or other rods may slide within the plurality of grooves 416 and cause rotation of the plurality of blades 420. Central axes of the back plate 412 and the rotational chuck plate 415 may be aligned and may form the same axis.

Figure 4E:
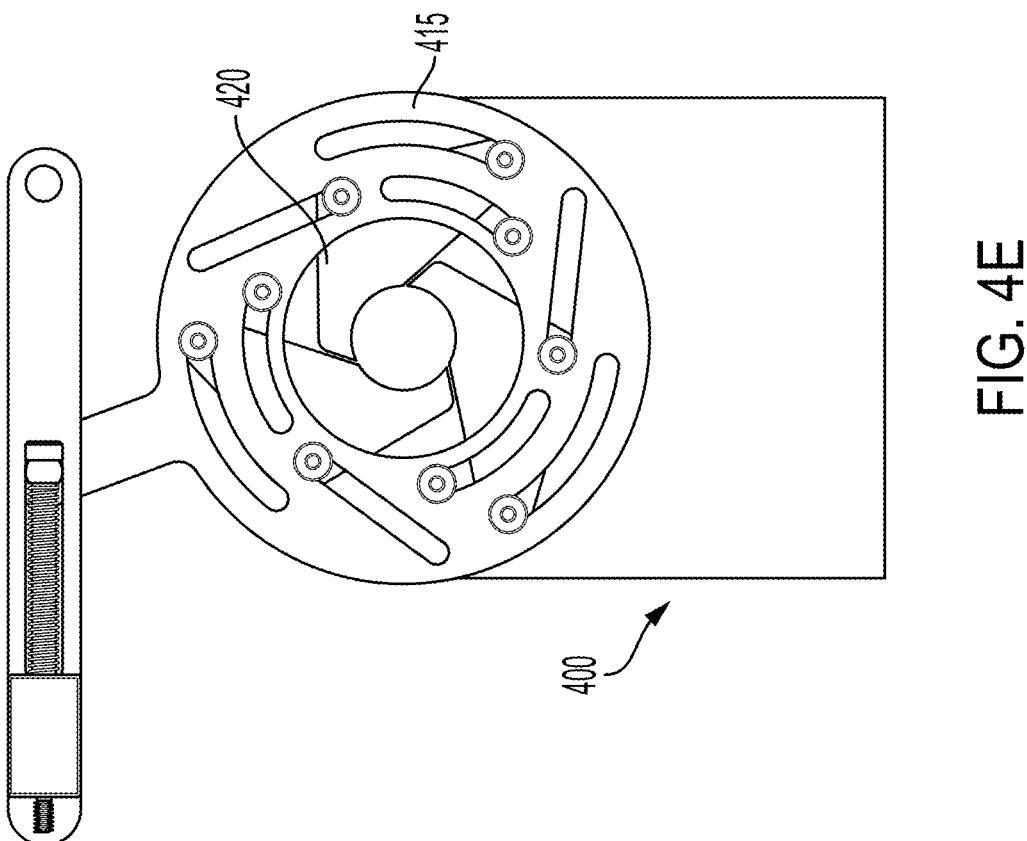
FIG. 4E illustrates another example of a front planar view of a grabber chuck, according to some exemplary embodiments.

FIGS. 4D-4F illustrate various additional example views of the grabber chuck 400, according to certain exemplary embodiments. For example, FIGS. 4D and 4E may illustrate planar views of a second side (e.g., a front side) of the grabber chuck 400.

Various exemplary embodiments may provide a deboning system and method which may advantageously provide for deboning a poultry carcass which reduces the amount of liquid and/or compressed air needed and/or entirely eliminates the use of liquid and/or compressed air during an improved deboning process. Certain exemplary embodiments may provide for improved efficiency and effectiveness in removing the bones from the poultry carcass semi-automatically using actuated pushing and pulling mechanisms, which use little to no compressed air and liquid (e.g., water), which reduce damage to the deboned poultry and the need to unnecessary post-processing of the deboned poultry.

Certain exemplary embodiments may provide a method implementing the deboning system 100 to debone a poultry carcass. In an exemplary method of the deboning process, a poultry carcass, or a part of the poultry carcass/product, may be placed into a cavity of one or more holders located on a transport conveyor (e.g., an electrically powered transport indexing conveyor) when the transport conveyor is in a stop position. The transport conveyor may move the holder and the poultry product to a cutting device, such as a rotary electrically powered round type cutting blade. The round type cutting blade may cut and sever a bone of the poultry product at the joint end and may remove a portion of the bone. In some exemplary embodiments, each time the transport conveyor stops, additional poultry product may be inserted into one or more holders which are empty.

After the bone cutting and removal, the transport conveyor may move the cut poultry product to a bone removal (deboning) device/module. When the poultry product is in the bone removal device/module, a pushing actuator (e.g., an electric type of cylinder) may begin to push (e.g., apply a biasing force) on the cut end of the bone of the poultry product. Concurrently or at an approximately similar time, a holder actuator of a holder chuck may cause a plurality of blades of the holder chuck to hold a portion of the poultry product and a grabber actuator of a grabber chuck may cause a plurality of blades of the grabber chuck to grab the end of the bone of the poultry product. The grabber chuck and the pushing actuator may then move to respectively pull and push the bone of the poultry product to cause removal of the bone from the poultry product. For example, the grabber chuck and the pushing actuator may move simultaneously pull and push the bone through the meat and remove the meat from the bone.

Once the bone is removed from the poultry product, the bone may exit the bone removal module/device (e.g., by gravity). For example, the bone may exit the bone removal module/device into a cavity underneath the bone removal module/device. The deboned meat may then remain in the holder on the transport conveyor and may again be moved by the transport conveyor for final processing and/or packaging. Various exemplary embodiments may provide that the method may improve the efficiency and effectiveness of the deboning of the poultry product.

FIG. 5 illustrates an example flow diagram of a deboning method, according to certain exemplary embodiments. In an example embodiment, the method of FIG. 5 may be performed by a deboning system and/or deboning device which processes poultry meat by removing poultry meat from the carcass of the animal.

According to various exemplary embodiments, the method of FIG. 5 may include, at 510, transporting, on a conveyor, a holding container. The holding container may be configured to hold a poultry product. At 520, the method may also include actuating one or more blades of a holding device to extend into an opening configured to receive a first portion of the poultry product and hold the first portion of the poultry product, and at 530, actuating one or more blades of a grabber device to extend into an opening configured to receive a second portion of the poultry product and grab the second portion of the poultry product. At 540, the method may further include moving the grabber device away from the holding device to remove a bone in the second portion from the poultry product.

Certain exemplary embodiments may provide the one or more blades of the holder device and the one or more blades of the grabber device may be configured to rotate circumferentially to surround the poultry product. The method may also include cutting, by a cutting device, an end of the poultry product located in the holder. The cutting device may include a rotary blade. Some exemplary embodiments may provide that the method also includes transporting the holder to the cutting device and then to a deboning apparatus which comprises the holding device and the grabber device. An edge of the one or more blades of the grabber device may be bevelled to a greater angle than an angle of an edge of the one or more blades of the holder device. The method may also include applying a pushing force, by one or more pushing devices, to an end of the poultry product. The pushing force may be configured to bias the poultry product into the holder device and the grabber device. The pushing force may be applied simultaneously with a pulling force applied by the grabber device to the second portion of the poultry product to perform bone removal.

Some exemplary embodiments may provide an apparatus including a holder device. The holder device may include a holder chuck configured to hold a poultry product. The holder chuck may include an opening configured to receive a first portion of the poultry product and one or more blades configured to extend into the opening and hold the first portion of the poultry product. The apparatus may further include a grabber device. The grabber device may include a grabber chuck configured to grab a second portion of the poultry product. The grabber chuck may include an opening configured to receive the second portion of the poultry product and one or more blades configured to extend into the opening and engage the second portion of the poultry product. The grabber device may be configured to move away from the holder chuck to remove a bone in the second portion of the poultry product.

Certain exemplary embodiments may provide the holder device further includes a holder actuator configured to extend the one or more blades into the opening of the holder device or retract the one or more blades from the opening of the holder device. The grabber device may include a grabber actuator configured to extend the one or more blades into the opening of the grabber device or retract the one or more blades from the opening of the grabber device. The one or more blades of the holder device and the one or more blades of the grabber device may be configured to rotate circumferentially to surround the poultry product. An edge of the one or more blades of the holder device and an edge of the one or more blades of the grabber device may be bevelled. The edge of the one or more blades of the grabber device may be bevelled to a greater angle than an angle of the edge of the one or more blades of the holder device. Some exemplary embodiments may provide that the apparatus also includes one or more pushing devices configured to linearly extend to apply a pushing force to an end of the poultry product. The pushing force may be configured to bias the poultry product into the holder device and the grabber device. The one or more pushing devices may be configured to apply the pushing force simultaneously with a pulling force applied by the grabber device to the second portion of the poultry product to perform bone removal.

Various exemplary embodiments may provide an apparatus including a holding container configured to hold a poultry product and a conveyor configured to move the holding container. The apparatus may also include a deboning device. The deboning device may include a holder device including a holder chuck configured to hold the poultry product which protrudes from the holder device. The holder chuck may include an opening configured to receive a first portion of the poultry product and one or more blades configured to extend into the opening and engage the first portion of the poultry product. The deboning device may also include a grabber device including a grabber chuck configured to grab a second portion of the poultry product. The grabber chuck may include an opening configured to receive a second portion of the poultry product and one or more blades configured to extend into the opening and engage the second portion of the poultry product. The grabber device may be configured to move away from the holder chuck to remove a bone in the second portion of the poultry product.

Some exemplary embodiments may provide that the holder device may include a holder actuator configured to extend the one or more blades into the opening of the holder device or retract the one or more blades from the opening of the holder device. The grabber device may include a grabber actuator configured to extend the one or more blades into the opening of the grabber device or retract the one or more blades from the opening of the grabber device. The one or more blades of the holder device and the one or more blades of the grabber device may be configured to rotate circumferentially to surround the poultry product. The apparatus may also include a cutting device configured to cut an end of the poultry product, which comprises a rotary blade. An edge of the one or more blades of the grabber device may be bevelled to a greater angle than an angle of an edge of the one or more blades of the holder device. The apparatus may further include one or more pushing devices configured to linearly extend to apply a pushing force to an end of the poultry product. The pushing force may be configured to bias the poultry product into the holder device and the grabber device. The one or more pushing devices may be configured to apply the pushing force simultaneously with a pulling force applied by the grabber device to the second portion of the poultry product to perform bone removal.

Certain exemplary embodiments may provide an apparatus including means for performed various functions of the deboning systems and apparatuses described herein. For example, some exemplary embodiments may provide an apparatus including holding means for holding a poultry product. The holding means may include an opening configured to receive a first portion of the poultry product and one or more blades configured to extend into the opening and hold the first portion of the poultry product. The apparatus may also include grabbing means for grabbing a second portion of the poultry product. The grabbing means may include an opening configured to receive the second portion of the poultry product and one or more blades configured to extend into the opening and engage the second portion of the poultry product. The grabbing means may provide for moving away from the holder chuck to remove a bone in the second portion of the poultry product.

Some exemplary embodiments may provide an apparatus including means for actuating one or more blades of a holding device to extend into an opening configured to receive a first portion of a poultry product and hold the first portion of the poultry product. The apparatus may also include means for actuating one or more blades of a grabber device to extend into an opening configured to receive a second portion of the poultry product and grab the second portion of the poultry product and means for moving the grabber device away from the holding device to remove a bone in the second portion from the poultry product.

Various exemplary embodiments may provide that the deboning system includes a plurality of sensors and/or detectors which are connected to a computer device for monitoring various aspects of the deboning system. For example, one or more sensors may detect a location of each of the holders and the relative location of the holders in reference to the cutting device, the holder chuck, the grabber chuck, and/or the pushing device. Further, one or more sensors, such as pressure sensors, may be provided to detect a force applied by the pushing device and/or the grabber device, and/or the holder device. The force applied by the pushing device and/or the grabber device, and/or the holder device may be the force or pressure of grabbing, pushing and/or pulling the poultry product and the bone thereof.

Certain exemplary embodiments may provide that control of the deboning system may be performed by one or multiple computer devices. The computer devices may be connected to, or otherwise share detection information with, the plurality of sensors and/or detectors. The computer devices may allow for setting various parameters, thresholds, and/or controls for performing the operations of the deboning system as described herein. For example, the one or more computer devices may control the movement of the conveyor, one or more of the actuators, operations of the pushing device and/or the grabber device and/or the holder device and/or the cutting device.

A computer connected to the deboning system may be configured as circuitry, a standalone computer, multiple interconnected computers, or a microprocessor, such as single-chip computer element, or as a chipset, including at least a memory for providing storage capacity used for arithmetic operation and an operation processor for executing the arithmetic operation. As used herein, the term "circuitry" may refer to hardware-only circuitry implementations (for example, analog and/or digital circuitry), combinations of hardware circuits and software, combinations of analog and/or digital hardware circuits with software/firmware, any portions of hardware processor(s) with software, including digital signal processors, that work together to cause an apparatus and/or system to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor or multiple processors, or portion of a hardware circuit or processor, and the accompanying software and/or firmware.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "apparatus," "device" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments.

We claim:

1. An apparatus, comprising:

a holder device comprising a holder chuck configured to hold a poultry product, wherein the holder chuck comprises a first opening configured to receive a first portion of the poultry product and first one or more blades configured to extend into the first opening and hold the first portion of the poultry product; and a grabber device comprising a grabber chuck configured to grab a second portion of the poultry product, wherein the grabber chuck comprises a second opening configured to receive the second portion of the poultry product and second one or more blades configured to extend into the second opening and engage the second portion of the poultry product, and wherein the grabber device is configured to move away from the holder chuck to remove a bone in the second portion of the poultry product.

2. The apparatus according to claim 1, wherein:

the holder device further comprises a holder actuator configured to extend the first one or more blades into the first opening of the holder device or retract the first one or more blades from the first opening of the holder device; and the grabber device further comprises a grabber actuator configured to extend the second one or more blades into the second opening of the grabber device or retract the second one or more blades from the second opening of the grabber device.

3. The apparatus according to claim 1, wherein the first one or more blades of the holder device and the second one or more blades of the grabber device are configured to rotate circumferentially to surround the poultry product.

4. The apparatus according to claim 1, wherein a first edge of the first one or more blades of the holder device and a second edge of the second one or more blades of the grabber device are bevelled.

5. The apparatus according to claim 4, wherein the second edge of the second one or more blades of the grabber device are bevelled to a greater angle than an angle of the first edge of the first one or more blades of the holder device.

6. The apparatus according to claim 1, further comprising one or more pushing devices configured to linearly extend to apply a pushing force to an end of the poultry product, wherein the pushing force is configured to bias the poultry product into the holder device and the grabber device.

7. The apparatus according to claim 6, wherein the one or more pushing devices are configured to apply the pushing force simultaneously with a pulling force applied by the grabber device to the second portion of the poultry product to perform bone removal.

8. An apparatus, comprising:

a holding container configured to hold a poultry product;

a conveyor configured to move the holding container; and a deboning device comprising:

a holder device comprising a holder chuck configured to hold the poultry product which protrudes from the holder device, wherein the holder chuck comprises a first opening configured to receive a first portion of the poultry product and first one or more blades configured to extend into the first opening and engage the first portion of the poultry product, and a grabber device comprising a grabber chuck configured to grab a second portion of the poultry product, wherein the grabber chuck comprises a second opening configured to receive a second portion of the poultry product and second one or more blades configured to extend into the second opening and engage the second portion of the poultry product, and wherein the grabber device is configured to move away from the holder chuck to remove a bone in the second portion of the poultry product.

9. The apparatus according to claim 8, wherein:

the holder device further comprises a holder actuator configured to extend the first one or more blades into the first opening of the holder device or retract the first one or more blades from the first opening of the holder device;

the grabber device further comprises a grabber actuator configured to extend the second one or more blades into the second opening of the grabber device or retract the second one or more blades from the second opening of the grabber device; and the first one or more blades of the holder device and the second one or more blades of the grabber device are configured to rotate circumferentially to surround the poultry product.

10. The apparatus according to claim 8, further comprising a cutting device configured to cut an end of the poultry product, wherein the cutting device comprises a rotary blade.

11. The apparatus according to claim 8, wherein an edge of the second one or more blades of the grabber device are bevelled to a greater angle than an angle of an edge of the first one or more blades of the holder device.

12. The apparatus according to claim 8, further comprising one or more pushing devices configured to linearly extend to apply a pushing force to an end of the poultry product, wherein the pushing force is configured to bias the poultry product into the holder device and the grabber device.

13. The apparatus according to claim 12, wherein the one or more pushing devices are configured to apply the pushing force simultaneously with a pulling force applied by the grabber device to the second portion of the poultry product to perform bone removal.

14. A method, comprising:

actuating first one or more blades of a holder device to extend into a first opening configured to receive a first portion of a poultry product and hold the first portion of the poultry product;

actuating second one or more blades of a grabber device to extend into a second opening configured to receive a second portion of the poultry product and grab the second portion of the poultry product, wherein the first one or more blades of the holder device and the second one or more blades of the grabber device are configured to rotate circumferentially to surround the poultry product; and moving the grabber device away from the holder device to remove a bone in the second portion from the poultry product.

15. The method according to claim 14, further comprising cutting, by a cutting device, an end of the poultry product located in the holder, wherein the cutting device comprises a rotary blade.

16. The method according to claim 15, further comprising transporting, by a conveyor, a holding container including the poultry product to the cutting device and then to a deboning apparatus which comprises the holding device and the grabber device.

17. The method according to claim 14, wherein an edge of the second one or more blades of the grabber device are bevelled to a greater angle than an angle of an edge of the first one or more blades of the holder device.

18. The method according to claim 14, further comprising applying a pushing force, by one or more pushing devices, to an end of the poultry product, wherein the pushing force is configured to bias the poultry product into the holder device and the grabber device.

19. The method according to claim 18, wherein the pushing force is applied simultaneously with a pulling force applied by the grabber device to the second portion of the poultry product to perform bone removal.

20. The method according to claim 14, further comprising transporting, on a conveyor, a holding container, wherein the holding container is configured to hold the poultry product.

\* \* \* \* \*